United States Patent [19]
Ando et al.

[11] 3,903,351

[45] Sept. 2, 1975

[54] PROCESS FOR BONDING VINYL CHLORIDE RESIN TO A SUBSTRATE

[75] Inventors: Ken Ando, Nara; Yuichi Harada; Yoshinobu Ohya, both of Amagasaki, all of Japan

[73] Assignee: Daicel Ltd., Osaka, Japan

[22] Filed: June 27, 1974

[21] Appl. No.: 483,889

[30] Foreign Application Priority Data
July 6, 1973    Japan................................ 48-76363

[52] U.S. Cl. ................ 428/425; 156/309; 156/315; 156/331; 260/858; 427/207; 427/407; 428/458; 428/474
[51] Int. Cl.² ................ B32B 27/40; B32B 27/34; B32B 15/08; C09J 7/00
[58] Field of Search ........ 117/72, 75, 76 F, 122 PA, 117/122 PF, 122 H; 156/309, 315, 331; 161/190, 214, 227, 247; 260/785, 77.5 A, 858

[56] References Cited
UNITED STATES PATENTS

| | | | |
|---|---|---|---|
| 3,218,215 | 11/1965 | Achterhof et al. | 156/321 |
| 3,718,713 | 2/1973 | Tanaka et al. | 260/858 |
| 3,770,122 | 11/1973 | Thiele | 206/84 |
| 3,781,381 | 12/1973 | Koleske et al. | 260/857 PE |
| 3,810,956 | 5/1974 | Kimura et al. | 260/857 R |
| 3,833,442 | 9/1974 | Russell et al. | 156/331 |

*Primary Examiner*—Charles E. Van Horn
*Assistant Examiner*—Robert A. Dawson
*Attorney, Agent, or Firm*—Woodhams, Blanchard and Flynn

[57] ABSTRACT

Polyvinyl chloride resin material is bonded to a substrate by a two layer adhesive in which the first layer is a mixture of nylon copolymer and thermoplastic polyurethane elastomer adjacent the polyvinyl chloride resin material and the second layer is a nylon copolymer adjacent the substrate.

7 Claims, No Drawings

PROCESS FOR BONDING VINYL CHLORIDE RESIN TO A SUBSTRATE

BACKGROUND OF THE INVENTION

1. Field of the Invention

This invention relates to a process for bonding vinyl chloride resin to a substrate, so as to form, for example, a vinyl chloride-coated steel plate or a vinyl chloride-coated veneer plywood.

2. Description of the Prior Art

In most of the conventional processes for producing a composite material by bonding vinyl chloride resin to a substrate, adhesives of the fluid application type have been used. However, according to this method of application of adhesives, sometimes, adhesion is not uniform depending upon the application conditions, particularly the amount of the adhesive applied, and the hardening conditions. Further a sufficient drying is required after the application or lamination and, therefore, a long pot life is required before the use of the resulting product. Accordingly, adhesives of the fluid application type have generally poor water resistance and thermal resistance and a low adhesive power. Further, in the use of such conventional adhesives, there has been a danger of environmental pollution because of the use of an organic solvent in the adhesive composition.

SUMMARY OF THE INVENTION

The object of the present invention is to provide a bonding process which overcomes the various disadvantages of the conventional processes.

According to the invention, there is provided a process wherein
I. a first layer of a mixture consisting essentially of
  a. 10 to 50 percent by weight, preferably 10 to 30 percent by weight, of a nylon copolymer of two or more nylon monomers selected from the group consisting of nylon salts having at least 10 carbon atoms, nylon-forming ω-amino acids and nylon-forming lactams, such as nylon 6/66, nylon 6/12, nylon 66/12, nylon 6/66/610, nylon 6/66/11, nylon 6/610/11, nylon 6/66/12 or nylon 6/612/12, and
  b. the balance, i.e. 90 to 50 percent by weight, preferably 90 to 70 percent by weight, of thermoplastic polyurethane elastomer, and
II. a second layer consisting essentially of a nylon copolymer as defined in I(a) above, is applied between (A) polyvinyl chloride resin material, such as a plasticized polyvinyl chloride sheet or web, and (B) a substrate such as metal, wood or paper sheet, web or plate, to form a sandwich assembly of A, I, II and B arranged in that order, with the surfaces of adjacent layers being in surface contact with each other, and the resulting assembly is subjected to pressure and heating to unite the parts to form a unitary product in which A is bonded through layers I and II to the surface of B.

In case a thermoplastic polyurethane elastomer alone is used for the bonding of the parts of a composite laminated material containing vinyl chloride resin as a base material, the adhesive power thereof to the metal, wood, paper or like substrate is poor, even though the adhesive power of the thermoplastic polyurethane elastomer to the vinyl chloride resin is excellent. On the other hand, in case a nylon resin alone is used, no adhesive power thereof to the vinyl chloride resin is observed, although the adhesive power of the nylon resin to a metal, wood, paper or like substrate is excellent. Further, in case only a simple mixture of both the thermoplastic polyurethane elastomer and the nylon resin is used, the characteristic features of the respective substances are reduced or lost and the adhesive power becomes insufficient.

According to the bonding process of the present invention, the deficiencies of the above processes are eliminated and there is achieved an effective bonding of the polyvinyl chloride resin to the substrate.

The nylon copolymer and the thermoplastic polyurethane elastomer used in the present invention must have melting points of less than 150°C because of the thermal resistance of the vinyl chloride resin. As for the amount of the nylon copolymer resin in the first layer comprising the mixture of the nylon copolymer and the thermoplastic polyurethane elastomer, to be applied on the bonding surface of the vinyl chloride resin, the nylon copolymer is used in an amount of at least 10 percent by weight, because if the thermoplastic polyurethane elastomer is used alone, i.e. the first layer is 100 percent by weight of said elastomer, a sufficient adhesive power cannot be obtained unless an excessively high heating temperature is used at the time of hot melt adhesion. Such a high temperature is not preferred because of the temperature limits of the thermal resistance of the vinyl chloride resin. Thus, by the incorporation of at least 10 percent by weight of nylon copolymer in the first layer, the softening point of the first layer mixture is lowered and further the melt viscosity thereof is reduced, whereby the bonding operation can be effected at a lower temperature. On the other hand, if more than 50 percent by weight of the nylon copolymer is contained in the first layer mixture, with the remainder being the thermoplastic polyurethane elastomer, the power of adhesion thereof to the vinyl chloride resin is not obtained.

As described above, according to the process of the present invention, a uniform adhesive power can be obtained without the problems that accompany trying to control the amount of fluid adhesive to be applied, as in the prior art, because the adhesive sandwiched between the two substrates has a two-layer structure comprising the first layer of a mixture of nylon copolymer and thermoplastic polyurethane elastomer and a second layer of nylon copolymer. The process has another merit in that the pot life of the adhesive can be extended extremely due to the hot melt bonding that is employed. Further, the water resistance and thermal resistance of the laminated end product are very high owing to the characteristic properties of the nylon copolymer and, of course, there is no risk of environmental pollution due to the use of organic solvents.

In such a composite laminated material, the thermal resistance of the vinyl chloride resin is relatively low and, therefore, a melting point of below 150°C is required for the first and second layers. As shown in Example 1 given below, according to the process of the present invention, a quite excellent bonding power is exhibited under the mild hot melt adhesion conditions of a temperature of 130°C, a pressure of 100 kg/cm$^2$ and a curing time of 10 minutes. Thus, all conditions required for the preparation of composite laminated materials of this kind are satisfied.

The first layer of a mixture of nylon copolymer and thermoplastic polyurethane elastomer and the second layer of the nylon copolymer can be prepared and applied separately or the two layers can be united in advance to form a two-layer prelaminate, which can be applied between the polyvinyl chloride material and the substrate. Such a pre-laminate can be made by known lamination methods such as combination of films of the two layers by using an adhesive; simultaneous melt extrusion and uniting of the two layers; or hot melt bonding of separately formed layers. Alternatively, a film comprising the mixture of nylon copolymer and thermoplastic polyurethane elastomer and then a film comprising the nylon copolymer can be applied successively onto the vinyl chloride compound material at the time of the bonding of the vinyl chloride compound material to the substrate. It is also possible, of course, to form the laminate by melting the respective resin powders.

The term higher nylon salt refers to the conventional, class of reaction products of diamines ($H_2NR_1NH_2$) with dicarboxylic acids (HOOC R COOH), useful as intermediates in the preparation of nylon polymers, exemplified by the reaction of hexamethylene diamine with adipic acid to form nylon 66 salt and the reaction of hexamethylene diamine with sebacic acid to form nylon 610 salt. As indicated, the sum of the carbon atoms in $R_1$ plus —CRC— is at least 10. The term ω-amino acid refers to compounds of the formula $H_2N$ R COOH, also a conventional class of materials used in the preparation of nylon polymers, exemplified by ω-amino caproic acid for nylon 6 and ω-aminoundecanoic acid for nylon 11. The term lactam refers to compounds of the formula

also a conventional class of materials used in the preparation of nylon polymers, exemplified by caprolactam for nylon 6 and lauryl lactam for nylon 12.

It is preferred to employ nylon copolymers of two or more of nylon 6, nylon 11, nylon 12, nylon 66 and nylon 610. The nylon copolymers contain at least about 5 percent, preferably about 10 percent by weight of each of the nylon monomers thereof. The proportions of the nylon monomers will be selected so that the melting point of the nylon copolymers will be below 150°C. It is preferred to employ terpolymers of nylon 12: nylon 6: nylon 66, copolymerized in a weight ratio of 25–40: 25–40: 25–40 percent by weight, especially about 1:1:1 parts by weight.

Thermoplastic polyurethane elastomers that can be used in the present invention are well known commercially available materials prepared by reacting an organic compound containing active hydrogen atoms such as, for example, a polyalkylene ether glycol or a difunctional polyester containing hydroxyl groups, with a chain-extending agent such as a low molecular weight diol, diamine or amino alcohol, and an organic diisocyanate, such as diphenyl diisocyanates, as described in greater detail in U.S. Pat. Nos. 2,871,218 and 2,899,411, the contents of which are incorporated herein by reference. Since these are well known materials of commerce, for example, as ELASTOLLAN E 1000 series (NIPPON ELASTOLLAN IND. LTD.) and Paraprene 22s (Nihon Polyurethane Co.), further description concerning them is believed to be unnecessary.

The temperatures, pressures and times of the bonding step are those which are sufficient to effect the bonding of the vinyl chloride sheet material through the laminate of the vinyl chloride contacting layer (I) and the substrate surface contacting layer (II). These values can be determined quite readily in practice. A miximum temperature of 150°C should be observed to prevent fusion or heat damage to the vinyl chloride. Ordinarily pressures in the range of 5 to 150 kg/cm² and times in the range of 1 to 20 minutes give satisfactory results.

DETAILED DESCRIPTION OF THE INVENTION

The invention will be further described by reference to the following illustrative examples.

Example 1

A film (hereinafter referred to as Film I) is prepared by extrusion lamination of (a) a 20μ film obtained by extrusion of a mixture of (1) 80 parts by weight of thermoplastic polyurethane elastomer pellets (Paraprene 22S of a softening point of 120°C; a product of Nihon Polyurethane Co.) and (2) 20 parts by weight of a commercial nylon copolymer (nylon 12/6/66, a nylon copolymer having a melting point of 132°C comprising one third by weight of lauryl lactam, one third by weight of caprolactam and one third by weight of nylon 66 salt); and (b) a 20μ film comprising 100 parts by weight of said nylon copolymer. Another film (hereinafter referred to as Film II) is prepared by lamination of (a) a 20μ film comprising (1) 100 parts by weight of said same thermoplastic polyurethane elastomer and (b) a 20μ film comprising 100 parts by weight of said same nylon copolymer. Those two laminate films I and II are respectively sandwiched between a commercial vinyl chloride sheet (thickness of 1.0 mm.; plasticizer content of 12 wt. percent) and a mild steel plate (thickness of 0.3 mm.). The respective assemblies are subjected to a treatment of hot melt adhesion by pressing and heating both surfaces under the conditions of a temperature of 130°C, a pressure of 100 Kg/cm² and a pressing time of 10 minutes. In each instance, the film of 100 parts of nylon copolymer was in surface contact with the steel plate. Both of the thus-obtained, bonded assemblies are subjected to a test according to JIS K 6744-1971 to measure its adhesive power. The results are shown in Table I given below.

For comparison, samples of polyvinyl chloride sheet and steel plate were bonded by hot melt adhesion by heating both surfaces using respectively (III) a 20μ film comprising 100 parts by weight of the same thermoplastic polyurethane elastomer alone, (IV) a 20μ film comprising 100 parts by weight of the same nylon copolymer alone, (V) films comprising conventional rubber adhesives, (VI) a film (40μ) comprising a mixture of 60 parts by weight of the same thermoplastic polyurethane elastomer and 40 parts by weight of the same nylon copolymer, and (VII) a film (40μ) comprising 40 parts by weight of the same thermoplastic polyurethane elastomer and 60 parts by weight of the same nylon copolymer. The adhesive powers of them are also measured and the results as shown in Table I are obtained.

Table I

| Adhesive | Properties of Adhesives Used For Vinyl Chloride Resin/Steel Plate | | | |
|---|---|---|---|---|
| | Condition of Adhesion | 180° Peeling off strength (Kg/25mm) | | |
| | | Under 20°C, 65% R.H. | Water resistance test (see Note *1) | Thermal resistance test (see Note *2) |
| Rubber adhesive of fluid application type (control) | | 7.5 – 14.0 | 5.0 – 10.5 | 6.0 – 15.5 |
| Nylon copolymer film (control) | | 1.5 – 2.0 | — | — |
| Polyurethane elastomer film (control) | | 2.5 – 3.5 | — | — |
| 60 Parts by weight of polyurethane elastomer/ 40 parts by weight of nylon copolymer (control) | 130°C 100 kg/cm² 10 minutes | 6.5 – 8.0 | 0 | 1 – 2.5 |
| 40 Parts by weight of polyurethane elastomer/ 60 parts by weight of nylon copolymer (control) | | 2.5 – 3.0 | 0 | 0.5 |
| Film I (Invention) | | 30.0 – 32.0 | 25.0 – 30.0 | 19.0 – 21.5 |
| Film II (Control) | | 6.5 – 12.5 | 4.5 – 10.5 | 6.0 – 14.5 |
| Rubber adhesive of fluid application type (control) | | 8.0 – 18.5 | 6.0 – 10.5 | 9.5 – 19.0 |
| Nylon copolymer film (control) | | 2.0 | – 3.0 | — |
| Polyurethane elastomer film (control) | 155°C 100 kg/cm² 10 minutes | 3.0 – 4.5 | — | — |
| Film I (Invention) | | 28.5 – 31.0 | 26.0 – 29.5 | 20.5 – 24.5 |
| Film II (Control) | | 29.0 – 32.0 | 20.0 – 22.5 | 19.5 – 23.0 |

Notes:
*1) after placing in stream of running city water of 20°C, for one week.
*2) after placing in an atmosphere at 80°C.

It is apparent from Table I that a stable, high adhesive power (i.e. strong bond) can be obtained even at a low adhesion (pressing) temperature if the adhesion is effected by the process of the present invention wherein there is used Film I obtained by lamination of (a) the film comprising a mixture of 80 parts by weight of the thermoplastic polyurethane elastomer and 20 parts by weight of the nylon copolymer and (b) the film comprising 100 parts by weight of the nylon copolymer. On the other hand, if there is used Film II obtained from the film of 100 parts by weight of thermoplastic polyurethane elastomer and a film of 100 parts by weight of nylon copolymer, a sufficient adhesive strength is obtained only at a high adhesion temperature, but, at a low adhesion temperature, the adhesive strength is about equal to that of the rubber adhesive and, moreover, a high dispersion is observed. When the nylon copolymer film or the thermoplastic polyurethane elastomer film is used alone, a strong bond is not obtained.

Further, it is apparent from Table I that, in case only the films comprising mixtures of polyurethane elastomer and copolymerized nylon are used, the bond obtained is far inferior to that of the case wherein Film I of the present invention is used.

Example 2

Films I and II as used in Example 1 are used for bonding vinyl chloride film (plasticizer content of 8 percent; thickness of 0.1 mm.) to a commercial single wood veneer (rosewood; water content of 6 percent; thickness of 0.25 mm.), and to kraft paper (weight: 65 g/m²). The combinations employed are vinyl chloride film/veneer and vinyl chloride film/kraft paper. The films I and II are applied so that the film of 100 parts by weight of nylon copolymer is in surface contact with the veneer plywood and the kraft paper, respectively. Hot melt pressure adhesion is effected at 120°C under a pressure 10 Kg/Cm² for one minute by heating both surfaces. The test results are shown in Table II as compared with those of the adhesion with a conventional vinyl chloride/vinyl acetate copolymer adhesive. The bond assemblies are subjected to a test according to JIS K-6744-1963 to observe its failure behavior.

Table II

| Items | Adhesive Property For Veneer Plywood | | |
|---|---|---|---|
| | Vinyl chloride/vinyl acetate adhesive | Film I | Film II |
| Adhesion strength of samples under 20°C, 65% R.H. | The adhesive layer separates from the substrates | Complete breakage of the material | Partial breakage of the material |
| Hot water resistance test (see Note *1) | Complete separation | No separation | Partial separation |
| Thermal resistance test (see Note *2) | Some blisters observed | No blisters observed | Some blisters observed |
| Repeated cold-heat test (see Note *3) | Some blisters observed | No blisters observed | Some blisters observed |

Notes:
*1) After immersion in water of 80°C for 2 hours, followed by drying at 80°C for one hour, the state of the sample was visually examined.
*2) After allowing to stand in air at 80°C for 2 hours, the state of the sample was visually examined.
*3) Immediately after allowing to stand in air at 80°C for 2 hours, the sample was allowed to stand in an atmosphere of –30°C for 2 hours. This cycle was repeated twice successively and the state of the sample was examined.

From Table II, it is apparent that excellent results are exhibited by employing Film I according to the process of the present invention as compared with the process using the conventional solvent-containing vinyl chloride/vinyl acetate adhesive of the fluid application type. The results obtained by using Film I are also superior to those obtained by using Film II. Similar tests are carried out for samples bonded with a 20μ film of the same nylon copolymer alone, a 20μ film of the same thermoplastic polyurethane elastomer alone, a 40μ film of 60 parts by weight of the same thermoplastic polyurethane elastomer and 40 parts by weight of the same nylon copolymer and a 40μ film of 40 parts by weight of the same thermoplastic polyurethane elastomer and 60 parts by weight of the same copolymerized nylon. In all cases, the bond strengths under normal conditions (20°C, 65% R.H.) are so weak that each adhesive layer separates from the substrates and results of both the hot water test and thermal resistances test showed complete separation.

The embodiments of the invention in which an exclusive property or privilege is claimed are defined as follows:

1. A process for preparing a laminate, which comprises: applying
    I. a first layer of a mixture consisting essentially of
        a. 10 to 50 percent by weight of nylon copolymer of two or more nylon monomers selected from the group consisting of nylon salts having at least 10 carbon atoms, nylon-forming ω-amino acids and nylon-forming lactams, and
        b. the balance is thermoplastic polyurethane elastomer, and
    II. a second layer consisting essentially of a nylon copolymer as defined in I(a) above between (A) polyvinyl chloride resin material, and (B) a substrate, to form a sandwich assembly of A, I, II and B arranged in surface contact with each other, in that order, and the resulting assembly is subjected to pressure and heating to unite the parts to form a unitary product in which A is bonded through layers I and II to the surface of B.

2. The process according to claim 1 wherein I consists essentially of 10 to 30 percent by weight of nylon copolymer having a melting point below 150°C and selected from the group consisting of nylon 6/66, nylon 6/12, nylon 66/12, nylon 6/66/610, nylon 6/66/11, nylon 6/612/12; and 90 to 70 percent by weight of a thermoplastic polyurethane elastomer having a melting point below 150°C.

3. The process according to claim 1 wherein I comprises about 20 percent by weight of nylon copolymer and about 80 percent by weight of thermoplastic polyurethane elastomer and said substrate surface is a steel surface.

4. A process according to claim 1 wherein a prelaminate of layer I and layer II is formed separately prior to the applying step.

5. A process according to claim 1 wherein the applying step is accomplished by forming successively layer I and then layer II onto said vinyl chloride resin material prior to placing layer II in surface contact with said substrate surface.

6. A process according to claim 1, in which said nylon copolymer is nylon 12/6/66, copolymerized in a weight ratio of 25–40: 25–40: 25–40 percent by weight.

7. A laminated product made by the process of claim 4.

* * * * *